Dec. 8, 1953 H. V. KINDSETH 2,661,876
HOPPER AND POWER ACTUATED DISCHARGE GATE
Filed June 15, 1951 4 Sheets-Sheet 1

INVENTOR.
Harold V. Kindseth
BY
Merchant & Merchant
ATTORNEYS

Dec. 8, 1953  H. V. KINDSETH  2,661,876
HOPPER AND POWER ACTUATED DISCHARGE GATE
Filed June 15, 1951  4 Sheets-Sheet 2
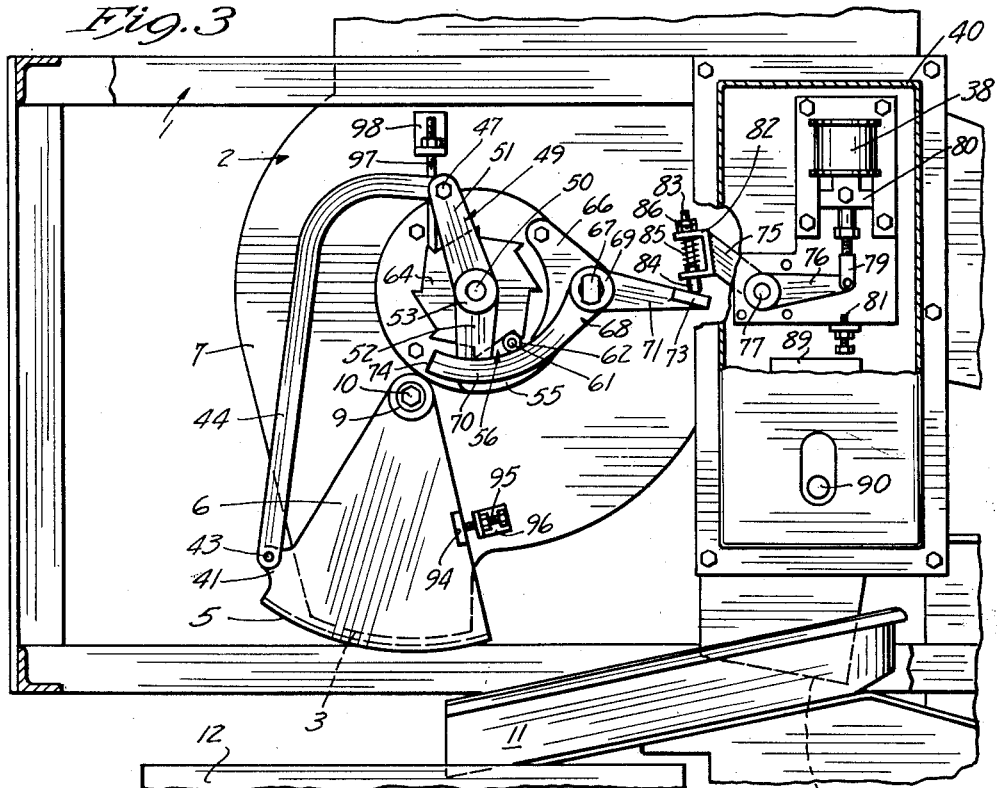
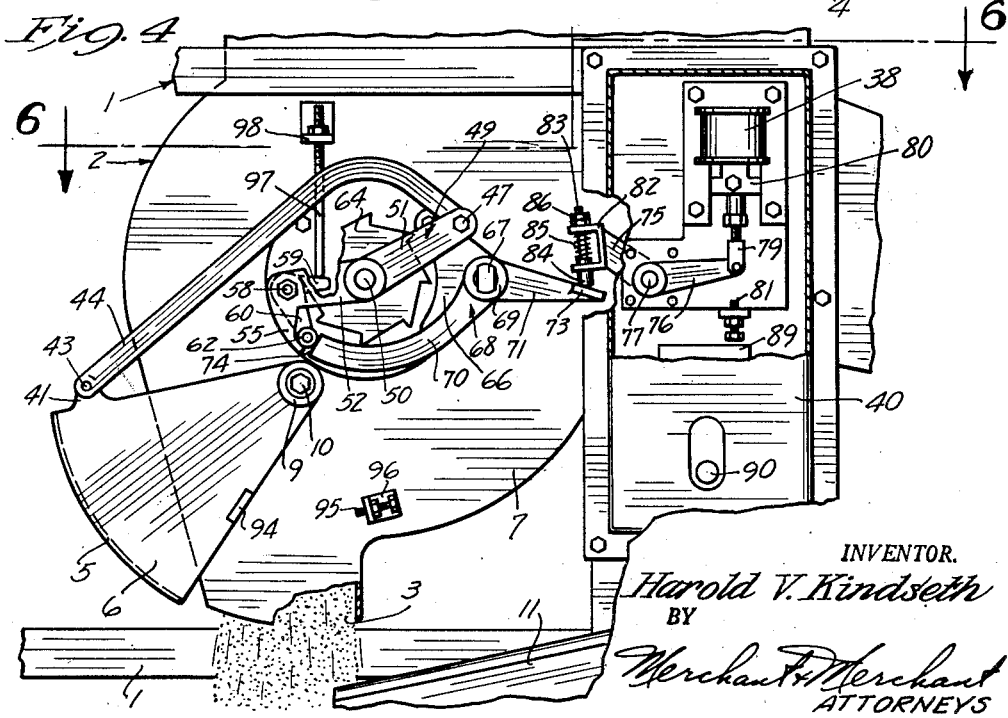
INVENTOR.
Harold V. Kindseth
BY
Merchant & Merchant
ATTORNEYS

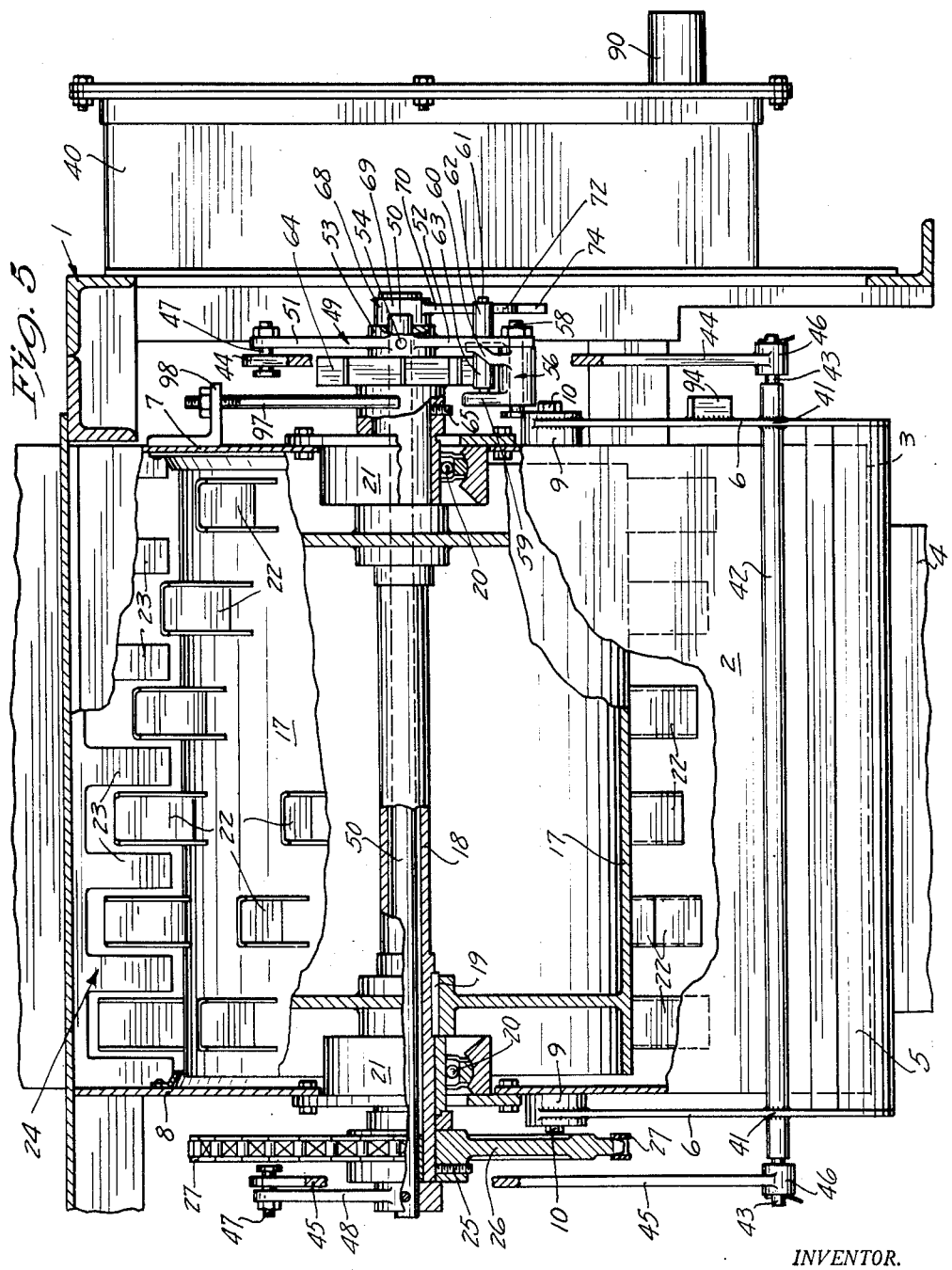

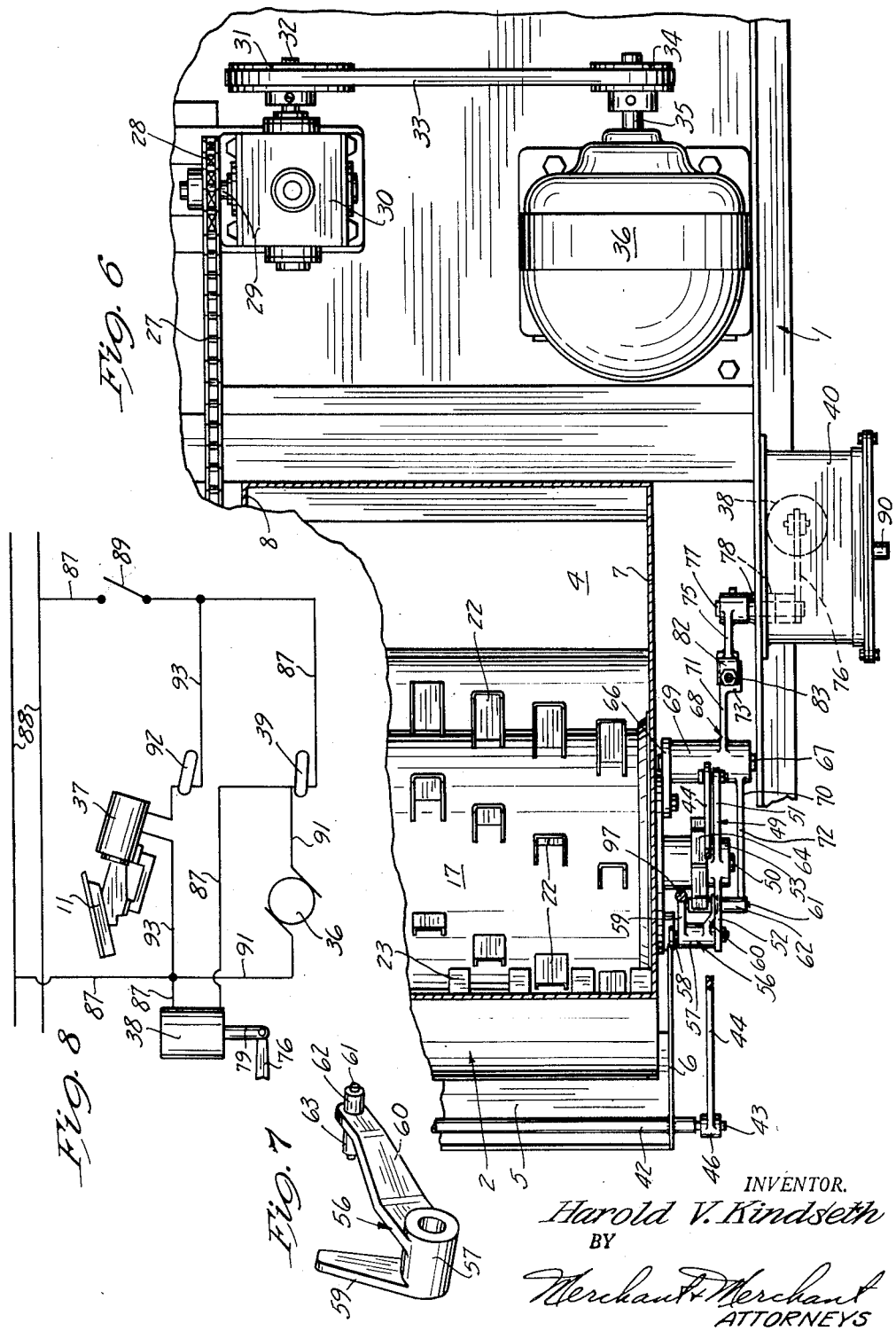

Patented Dec. 8, 1953

2,661,876

UNITED STATES PATENT OFFICE 2,661,876

HOPPER AND POWER ACTUATED DISCHARGE GATE

Harold V. Kindseth, Minneapolis, Minn., assignor to Bemis Bro. Bag Co., Minneapolis, Minn., a corporation of Missouri Application June 15, 1951, Serial No. 231,717

7 Claims. (Cl. 222—504)

My invention relates generally to packaging machines and, more specifically, to an automatic weighing scale for delivering equal weights of bulk material or the like to be packaged.

More particularly, my invention contemplates improved mechanism for automatically opening and closing the valve-acting gates of feeding hoppers and the like of packaging machines, said mechanism being controlled by weight differential in a receptacle receiving material from the feeding hopper.

In the packaging of bulk materials such as flour, sugar, granular feed, or the like in accordance with my invention, the greater part of the material to be packaged is fed to a weighing scale mounted receptacle in a bulk feed stream. Thereafter, the amount required to bring the dispensed material to the required weight is fed to the receptacle in a relatively slow or "dribble" feed stream. As above indicated, my present invention contemplates novel means for initiating and terminating the flow of material in the bulk feed stream.

One of the objects of my invention is the provision of novel mechanism for operating the valve-acting gate which is movable into and out of registration with the discharge opening of the feeding hopper, said mechanism requiring a minimum of power to control.

Another object of my invention is the provision of gate operating mechanism of the type set forth, which is simple and inexpensive to produce, which is highly efficient in operation, and which is rugged in construction and durable in use.

Another object of my invention is the provision of means whereby the valve-acting gate will automatically close and terminate feeding of material from the feeding hopper in the event of power failure.

The above and still further objects and advantages of my invention will become apparent from the following detailed specification, appended claims, and attached drawings.

Referring to the drawings, which illustrate the invention, and in which like characters indicate like parts throughout the several views:

Fig. 3 is an enlarged fragmentary view corresponding to a portion of Fig. 1, but showing a different position of some of the parts;

Fig. 4 is a view corresponding to Fig. 3, but showing a still different position of some of the parts;

Fig. 5 is an enlarged fragmentary view partly in end elevation and partly in section, taken substantially on the line 5—5 of Fig. 2;

Fig. 6 is a fragmentary view partly in plan and partly in horizontal section, taken substantially on the line 6—6 of Fig. 4;

Fig. 7 is a view in perspective of a pawl-acting bell crank of my invention; and Fig. 8 is a wiring diagram.

Figure 1:
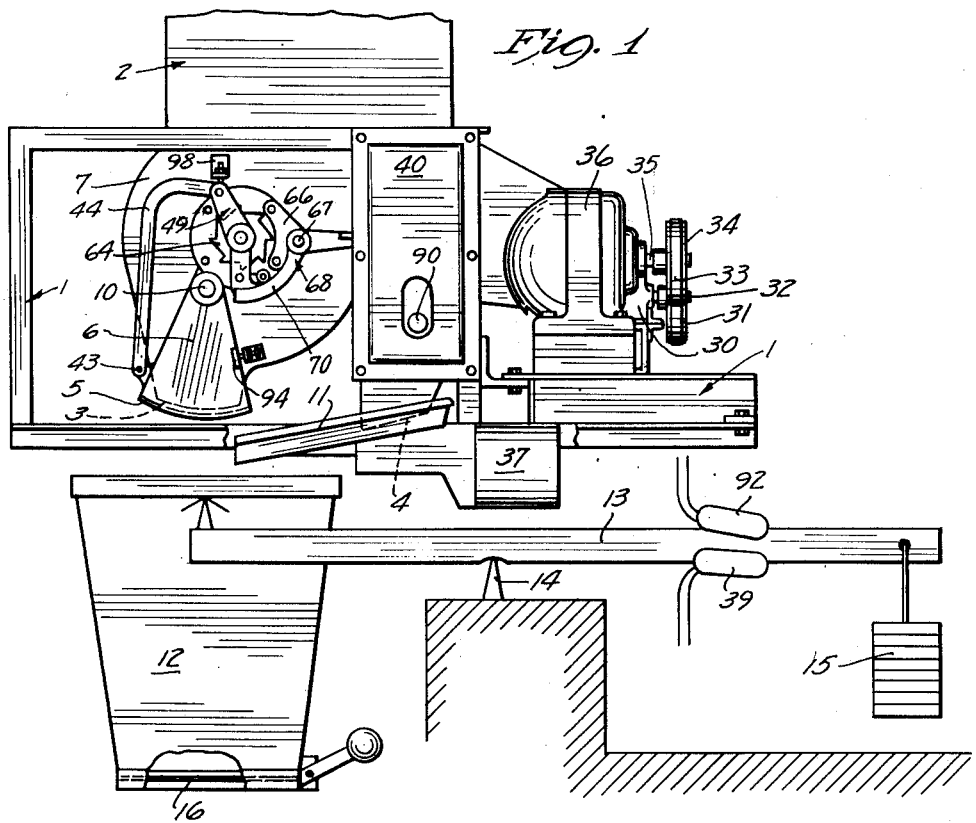
Fig. 1 is a partly diagrammatic view in side elevation of a weighing scale and feeder therefor, built in accordance with my invention.

Referring with greater detail to the drawings, the numeral 1 indicates in its entirety a frame structure in which is mounted a feeding hopper 2 having laterally spaced discharge openings 3 and 4 in its bottom portion. The discharge opening 3 is normally closed by a generally U-shaped valve acting gate 5, the side portions 6 of which extend upwardly on opposite side walls 7 and 8 and which at their upper ends are provided with aligned bosses 9 through which extend axially aligned trunnions or the like 10. The trunnions 10 are secured to the side walls 7 and 8 of the said hopper 2 and permit swinging movements of the gate 5 toward and away from a position underlying the discharge opening 3. An inclined feed trough 11 has its upper end portion underlying the discharge opening 4 for the reception of material fed by gravity through the discharge opening 4.

A receptacle 12 comprises a portion of a weighing scale mechanism and is shown as being mounted at one end of a scale beam 13 which is fulcrumed intermediate its ends to a suitable means of support 14. At its other end, the beam 13 is provided with counterbalancing weights or the like 15. With reference to Figs. 1 and 3, it will be seen that the receptacle 12 underlies the discharge opening 3 of the hopper 2 and the lower discharge end of the feed trough 11, whereby to receive material dispensed from both discharge openings 3 and 4. The weights 15 are sufficient to counterbalance the weight of the receptacle 12 in addition to the weight of a predetermined amount of material fed to the receptacle 12 from the hopper 2 through the discharge openings 3 and 4 and the feed trough 11. At its lower end, the receptacle 12 is provided with a conventional trap door or the like 16 which may be opened by suitable means, not shown, for the discharge of material contained therein into packages or bags, also not shown.

Figure 2:
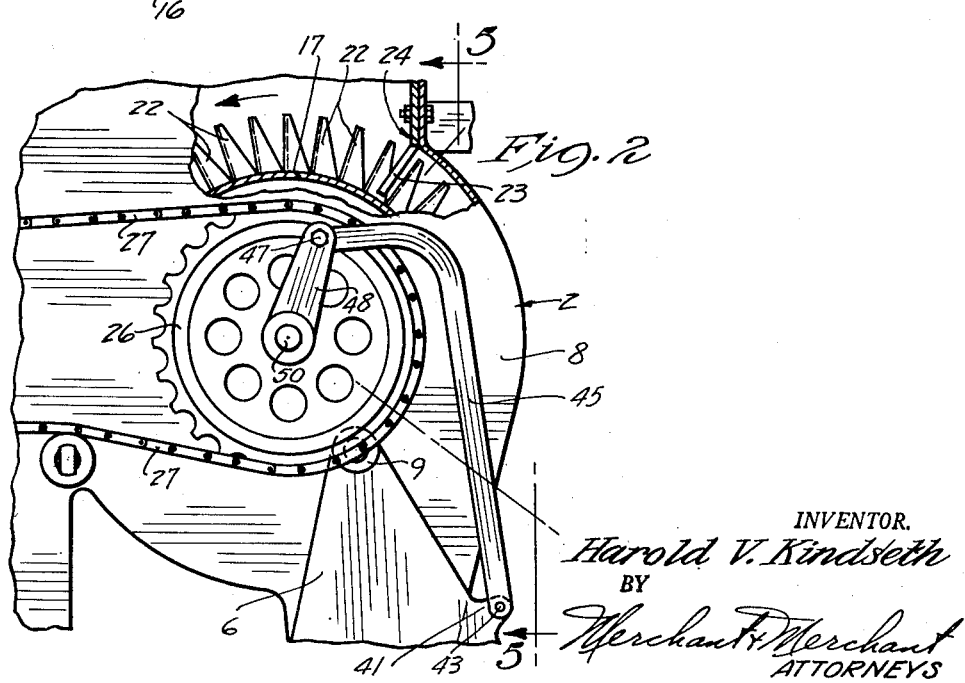
Fig. 2 is an enlarged fragmentary view as seen from the opposite side of Fig. 1, some parts being broken away and some parts shown in section.

A rotary feeding drum or the like 17 is mounted on a tubular shaft 18 and is rigidly secured thereto, for common rotation therewith, by means of a key or the like 19, see Figs. 2, 5, and 6. The tubular shaft 18 extends laterally through the hopper 2, the feeding drum being attached thereto in overlying relationship to the discharge opening 3. By particular reference to Fig. 5, it will be seen that the shaft 18 is journalled in anti-friction bearings or the like 20 which are mounted in flanged bearing holders 21, one each secured to an opposite side wall 7 and 8 of the hopper 2. The drum 17 is provided with a plurality of axially and circumferentially spaced feeding fingers 22 which project radially outwardly therefrom and which are adapted to pass between adjacent teeth 23 of a stationary comb or the like 24 rigidly mounted in the hopper 2. The teeth 23 extend radially inwardly toward the axis of the feeding drum 17 and cooperate with the fingers 22 in preventing large masses of material to be fed from adhering to the drum 17. This is particularly effective when the material to be dispensed is of a more or less cohesive nature, such as flour, certain feeds, and other like powdered or granular material. The above is fully disclosed and claimed in my copending application S. N. 231,718, filed June 15, 1951, and entitled "Regulator for Feeding Powdered or Granular Material."

The tubular shaft 18 extends laterally outwardly beyond the side walls 7 and 8 of the hopper 2 and has rigidly secured thereto laterally outwardly of the side wall 8 by means of a set screw or the like 25, a sprocket wheel 26, see Fig. 5. An endless link chain 27 runs over the sprocket wheel 26 and another sprocket wheel 28 mounted fast on the output shaft 29 of a conventional geared speed reducer 30. A pulley 31 is rigidly mounted on the input shaft 32 of the speed reducer 30 and has running thereover an endless drive belt 33 which runs over a drive pulley 34 fast on a shaft 35 of an electric motor 36, see Fig. 6. The motor 36 is rigidly bolted or otherwise secured to the frame 1. The drive motor 36 and the transmission mechanism above described impart rotation to the finger-equipped feeding drum 17 in a clockwise direction with respect to Figs. 1, 3, and 4, for a purpose which will hereinafter become apparent.

As hereinbefore stated, the main bulk of the charge of material to the receptacle is fed thereto through the discharge opening 3 in the hopper 2, after which the gate is closed and material added to the receptacle 12 in a relatively slow or dribble feed stream to obtain the desired weight. This is accomplished by causing vibration to be imparted to the inclined feeding trough 11. The feed trough 11 is carried by a vibratory device suitably mounted on the frame 1 and which comprises an electromagnetic vibratory motor 37. Said motor 37 does not in itself constitute the invention and, being well known in the art, it is not thought necessary to show or describe the same in detail.

Gate operating mechanism

My novel gate operating mechanism is adapted to be driven from the drive motor 36 and controlled by a solenoid 38 and a cooperating switch 39. The solenoid 38 is contained within a control box 40 mounted on the frame 1, and the switch 39 is of the conventional mercury type and, as illustrated in Fig. 1, is preferably mounted on a movable portion of the scale mechanism, such as the scale beam 13, whereby tilting of the beam 13 will impart similar tilting of the switch 39 to open or close a circuit therethrough.

The opposite side portions 6 of the gate 5 are provided with integrally formed ears 41 through which extends a shaft 42, the opposite ends of which extend laterally outwardly beyond the side portions 6 and terminate in diametrically reduced trunnions 43. A pair of rigid links 44 and 45 have their lower ends 46 pivotally mounted on the trunnion 43 and their upper ends pivotally mounted on a pair of axially aligned trunnion-forming studs or the like 47, one rigidly secured to the outer end of a crank arm 48 and the other rigidly secured to one end of a lever 49. With particular reference to Fig. 5, it will be seen that the link 44 is thus coupled to the lever 49 and that the link 45 is similarly coupled to the outer end of the crank arm 48. The inner end of the crank arm 48 is pinned or otherwise rigidly secured to one end of a shaft 50 which is journalled in and extends axially outwardly of the opposite ends of the tubular shaft 18. The lever 49 comprises a pair of lever arms 51 and 52 that project radially outwardly from an integrally formed boss or the like 53 and to the former of which is secured the trunnion-forming stud 47 associated with the upper end of the rigid link 44. The lever 49 is rigidly secured to the end of the shaft 50 opposite the crank arm 48 laterally outwardly from the adjacent end of the tubular shaft 18 by means of a pin or the like 54 extending through the shaft 50 and the boss 53. The lever arm 52 is provided at its outer end with a foot 55 which projects in a direction circumferentially about the axis of the shaft 50, the purpose of which will hereinafter become apparent.

A bell crank 56 is pivotally mounted at its intermediate portion 57 to a stub shaft or the like 58 rigidly mounted on the outer end portion of the lever arm 52. The bell crank 56 comprises radially outwardly projecting axially and circumferentially spaced arms 59 and 60, the latter of which is in the nature of a pawl having at its outer end a shaft or pin 61 on which is journalled a pair of aligned rollers 62 and 63 one each on an opposite side of the pawl 60. The pawl roller 63 is adapted to engage the teeth of a ratchet 64 which is rigidly secured by means of a set screw 65 to the end of the tubular shaft 18 extending outwardly of the side wall 7 of the hopper 2 upon rotary movement of the bell crank in one direction. The roller 62 overlies and extends axially outwardly beyond the foot 55 of the lever 49 and limits rotation of the bell crank 56 in the opposite direction. The bell crank 56 is preferably gravity biased in a direction to move the pawl 60 in a direction away from engagement of the roller 63 thereof with the ratchet 64 and toward engagement of the roller 62 with the foot 55.

The ratchet 64 being anchored to the tubular shaft 50 partakes of common rotation with the feeding drum 17, so that when the pawl 60 is moved into engagement therewith, the lever 49 is caused to rotate in a direction to swing the valve-acting gate 5 from its closed position of Figs. 1 to 3 inclusive, toward its open position of Fig. 4. Means for moving the pawl 60 into operative engagement with the ratchet 64 against the gravity bias exerted thereon comprises the solenoid 38 and cooperating mechanism, now to be described. A bearing bracket 66 is rigidly mounted to the flange of the bearing holder 21 on the side wall 7 of the hopper 2 and is provided with a laterally outwardly projecting shaft 67 in spaced parallel relation to the shaft 50. A lever 68 comprises a central hub 69 that is journalled for rotation on the shaft 67 and a pair of axially and circumferentially spaced radially outwardly projecting lever arms 70 and 71, the former of which is in the nature of a guide arm formed to provide an arcuate surface portion 72 and the latter of which is provided at its outer end with a laterally projecting ear 73. The radially outer end of the guide arm 70 defines a relatively flat abutment portion 74 which is engageable by the pawl-mounted roller 62 in one position of the lever 49, see Fig. 4, the arcuate surface portion 72 being engageable by the roller 62 in other positions of the lever 49. A pair of crank arms 75 and 76 have their inner ends rigidly mounted on the opposite ends of a shaft 77 journalled in a bearing boss 78 on the rear wall of the control box 40. With reference to Fig. 6, it will be seen that the crank arm 75 is disposed outwardly of the control box 40 while the crank arm 76 is contained within the box 40 and has its radially outer end pivotally secured to a rigid link 79 secured fast to the armature 80 of the solenoid 38. By reference to Fig. 4, it will be seen that a lock nut equipped stop screw or the like 81 underlies the lower end of the link 79 and the outer end of the crank arm 76 and limits downward movement of the link 79 and armature 80. The outer end of the crank arm 75 is bifurcated, as indicated at 82, to provide spaced bearings for a thrust pin 83, the lower end portion of which is formed to provide a head 84 engageable with the ear 73 of the lever arm 71. A coil compression spring 85 is interposed between the head 84 and the opposite side of the bifurcated portion 82 to bias the thrust pin 83 toward engagement of the head 84 with the ear 73. Adjustment nuts 86 are screw-threaded onto the upper end portion of the thrust pin 83 and limit movements thereof toward the ear 73. It should be noted that the guide arm 70 of the lever 68 being longer than the lever arm 71, the lever 68 will be gravity biased in a direction to move the guide arm 70 in a downward direction away from the ratchet 64 and to urge the lever arm 71 upwardly in the direction of engagement of the ear 73 with the head 84 of the thrust pin 83. In like manner, the crank arm 76, the link 79, and the armature 80, being collectively of greater weight than the crank arm 75 and parts carried thereby, de-energization of the solenoid 38 will cause rotation of the shaft 77 in a direction to move the head 84 of the thrust pin 83 away from engagement with the ear 73 of the lever arm 71.

Referring to the diagram of Fig. 8, it will be seen that the solenoid 38 and the switch 39 are interposed in series in a circuit comprising a lead 87 which extends from one side of a power line 88 to the other side thereof and in which lead is also interposed a manually operated master control switch 89. The switch 89 is contained within the control box 40 and is operated by a push button 90. The drive motor 36 is also controlled by the switch 39 being interposed in a lead 91 which is shunted around the solenoid 38. The electromagnetic vibratory motor 37 is connected in series with a mercury switch 92 in a lead 93 that is connected at its opposite ends to the lead 87 in parallel arrangement to the parallel circuits containing the motor 36, the solenoid 38, and the switch 39.

*Operation*

Assuming that the control switch 89 is open, the gate 5 is positioned to close the discharge opening 3, and the drive motor 36, the solenoid 38, and the vibratory motor 37 are deenergized. If the receptacle 12 is empty, the switches 39 and 92 carried by the scale beam 13 are closed. It will be noted that one of the side portions 6 of the gate 5 is provided with a laterally outwardly projecting lug 94 which engages a stop screw 95 mounted in a bracket 96 rigidly secured to the adjacent hopper side wall 7 to limit movements of the gate 5 toward a closed position. Further assuming that the mercury switches 39 and 92 are closed, manual closing of the control switch 89 completes parallel circuits through the drive motor 36, the vibratory motor 37, and the solenoid 38 to initiate operation of the same. Energization of the motor 36 will cause rotation of the feeding drum and corresponding rotation of the ratchet 64 coupled thereto. Simultaneous energization of the solenoid 38 causes the armature 80 thereto to be moved in an upward direction, whereby to impart rocking movement to the crank arms 75 and 76 and their interconnecting shaft 77 in a direction to depress the guide arm 71 and raise the guide arm 70 to their positions of Fig. 3. Inasmuch as the arcuate surface 72 of the guide arm 70 underlies the pawl-mounted roller 62, solenoid imparted movement of the guide arm 70 toward the ratchet 64 will move the pawl 60 toward engagement of the pawl roller 63 with one of the teeth of the rotating ratchet 64, whereupon the pawl 60 and the lever 49 will be rotated to a point where the pawl-mounted roller 62 has traversed the arcuate surface portion 72 to the outer end of the guide arm 70. At this point, the bell crank 56 under gravity bias will swing about the axis of the stub shaft 58 in a direction to move the pawl-mounted roller 62 into engagement with the abutment-forming outer end 74 of the guide arm 70. At this point, it should be noted that rotation of the lever 49 imparts similar rotation to the shaft 50 and corresponding swinging movement to the crank arm 48. As shown, particularly in Figs. 3 and 4, the links 44 and 45 are moved by their respective arms 51 and 48 in directions to open the gate 5, and engagement of the abutment portion 74 by the pawl roller 62 will hold the gate 5 open for a predetermined time interval. It will here be noted that provision is made for positively imparting swinging movement to the bell crank 56 to move the same into the position shown in Fig. 4 after the roller 62 has traversed the arcuate surface portion 72 of the guide arm 70. To accomplish this end, I provide an adjustable stop pin or rod 97 screw-threaded into a supporting bracket 98 rigidly secured to the side wall 7 of the hopper 2. The lower end of the rod 97 is disposed in the path of ratchet-imparted travel of the bell crank arm 59 and, upon interception thereof, will positively disengage the pawl roller 63 from the ratchet 64 and move the same into its position of Fig. 4. Obviously, this disengagement of the pawl roller from ratchet will stop further opening movements of the gate 5. It will also be noted that in this position of the bell crank 56, the pawl roller 62 will not only be engaging the abutment portion 74 of the guide arm 70 but will also be held against the extended foot 55 of the lever 49.

The mercury switches 39 and 92 are disposed on the scale beam 13 in such a manner that when a predetermined quantity by weight less than the ultimate quantity desired is received in the receptacle 12, movement of the scale beam 13 will cause the switch 39 to open whereby to deenergize the solenoid 38 and the drive motor 36.

De-energization of the solenoid 38 will permit the lever 68 to move to its position of Fig. 1 thereby moving the abutment portion 74 out of the path of return travel of the pawl-mounted roller 62 and permit the lever 49, the links 44 and 45, and the gate 5 to swing to their gate-closed position of Figs. 1 and 2 under the action of gravity. Thereafter, the dribble feed will continue to function until the exact desired amount of material is dispensed to the receptacle 12 causing further movement of the scale beam 13 to a point where the mercury switch 92 is opened to de-energize the dribble feed mechanism. After the trap door 16 has been opened to discharge the material contained in the receptacle 12 to a suitable container, the counterweights 15 will cause the scale beam 13 to again swing in a direction to close the switches 39 and 92, thereby initiating another cycle of operation.

From the above, it should be obvious that very little power is needed to move the pawl into engagement with the ratchet and that the power necessary to open the gate 5 is amply supplied by the drive motor 36. Inasmuch as the ratchet rotates continuously with the feeding drum 17, opening movement of the gate 5 is initiated immediately upon energization of the solenoid 38 so that operation of the whole dispensing and weighing mechanism is rapid and efficient, the time consumed in an operational cycle being governed only by the size of the discharge opening 3, the speed of dribble feed, and that at which the material is discharged from the receptacle.

The strain relief spring 85 operates to cushion the impact between the guide arm 70, the pawl rollers 62 and 63, and the teeth of the ratchet 64, and is particularly effective in the event that the pawl roller 63 strikes the point of one of the ratchet teeth. When this condition arises, the spring 85 is under sufficient compression to move the pawl roller 63 toward the bottom of the next succeeding ratchet tooth as the ratchet rotates.

In the event of a power failure in the power line 88, the solenoid 38 will be immediately de-energized, thereby permitting the gate 5 to close, thus preventing further feeding of material to the receptacle 12.

While I have shown and described a preferred embodiment of my novel mechanism, it will be understood that the same is capable of modification as to structure and arrangement of parts and that modification may be made without departure from the spirit and scope of the invention as defined in the claims.

What I claim is:

1. In a device of the class described, a hopper for holding material to be dispensed and having a discharge opening through which said material is fed; a gate normally closing said discharge opening; means mounting the gate for movements in opposite directions to open and close the discharge opening; operating mechanism for the gate including a power driven rotary ratchet, a cooperating pawl yieldingly biased away from the ratchet, and linkage connecting the pawl with the gate and mounting the pawl for limited arcuate movements with said ratchet; a guide arm for said pawl; and means mounting the guide arm for movements toward and away from the ratchet, said guide arm having a surface portion traversed by the pawl during opening movements of the gate and an abutment portion engageable by the pawl when the gate is open to maintain the gate in its open position, movement of the guide arm toward the ratchet causing engagement of the pawl by the ratchet for common rotary movement therewith to open the gate during the traversing of said pawl over said surface portion of the guide arm, said pawl moving out of engagement with the ratchet and into engagement with said abutment portion under the action of said yielding bias when the pawl has traversed said surface portion, whereby to maintain the gate in its open position, movement of said guide arm in the opposite direction releasing said abutment portion from engagement with the pawl and permitting movement of the pawl in a reverse direction to close the gate.

2. The structure defined in claim 1 in which said linkage includes a lever on which said pawl is mounted, and in further combination with means mounting said lever for pivotal movements about the axis of rotation of said ratchet.

3. The structure defined in claim 1 in further combination with stop means engageable with the pawl to positively disengage the pawl from the ratchet and move said pawl into engagement with the abutment on said guide arm.

4. In a device of the class described, a hopper for holding material to be dispensed and having a discharge opening through which the material is fed; a gate normally closing said discharge opening; means mounting the gate for movements in opposite directions to open and close the discharge opening; operating mechanism for the gate including a power driven rotary ratchet, a lever mounted for pivotal movements about the axis of rotation of the ratchet, linkage connecting the lever to the gate, a pawl, and means mounting the pawl on the lever for limited swinging movements into and out of engagement with the ratchet, said pawl being yieldingly biased away from engagement with the ratchet; a guide arm for the pawl; and means mounting the guide arm for movements toward and away from the ratchet, said guide arm having an arcuate surface portion traversed by the pawl during opening movements of the gate, the outer end of said guide arm defining an abutment portion engageable by the pawl when the gate is open to maintain the gate in its open position, movement of the guide arm toward the ratchet causing engagement of the pawl by the ratchet for common rotary movement therewith to open the gate during the traversing of the pawl over said arcuate portion, said pawl moving out of engagement with the ratchet and into engagement with said abutment portion under the action of said yielding bias when the pawl has traversed said arcuate surface portion, whereby to maintain the gate in its open position, movement of said guide arm in the opposite direction releasing the end thereof from engagement with the pawl and permitting movement of the pawl in a reverse direction to close the gate.

5. In a device of the class described, a hopper for holding material to be dispensed and having a discharge opening through which the material is fed; a gate normally closing said discharge opening; means mounting the gate for movements in opposite directions to open and close the discharge opening; operating mechanism for the gate including a power driven rotary ratchet, a lever mounted for pivotal movements about the axis of rotation of the ratchet, linkage connecting the lever to the gate, and a bell crank pivotally mounted at its intermediate portion to said lever, one arm of said bell crank being in the nature of a pawl engageable with said ratchet; a pawl-engaging guide arm, means mounting said guide arm for swinging movements toward and away from the ratchet, said guide arm having an arcuate surface portion engaged and traversed by the pawl during opening movements of the gate, the free outer end of said guide arm defining an abutment portion engageable by the pawl when the gate is open to maintain the gate in its open position; mechanism for imparting swinging movement to said guide arm in a direction to bring the pawl into engagement with the ratchet for common rotary movement therewith to open the gate, and stop means engageable with the other arm of said bell crank to move said pawl into engagement with the free end of said guide arm when the pawl has traversed the arcuate surface portion thereof, whereby to maintain the gate in its open position, movement of said guide arm in the opposite direction releasing the free end thereof from engagement with the pawl and permitting movement of the pawl in a reverse direction to close the gate.

6. The structure defined in claim 5 in further combination with stop means on said lever positively limiting movement of the pawl in a direction away from said ratchet.

7. The structure defined in claim 5 in which the mechanism for imparting swinging movements to said guide arm includes means for exerting yielding bias to said guide arm in the direction of said ratchet, whereby to cushion the impact of said pawl against the ratchet.

HAROLD V. KINDSETH.

References Cited in the file of this patent

UNITED STATES PATENTS

| Number | Name | Date |
|---|---|---|
| 334,092 | Schroeder | Jan. 12, 1886 |
| 2,398,887 | Drinnon | Apr. 23, 1946 |

FOREIGN PATENTS

| Number | Country | Date |
|---|---|---|
| 733,270 | France | July 5, 1932 |